Figure 1:
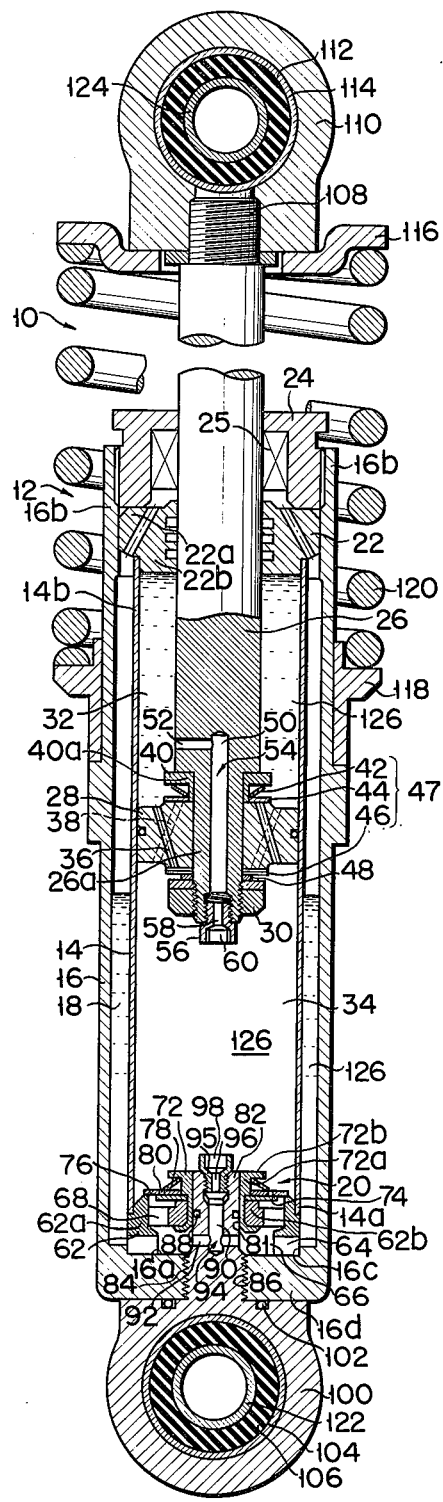

United States Patent [19]

Watanabe

[11] 3,882,977
[45] May 13, 1975

[54] HYDRAULIC SHOCK ABSORBER
[75] Inventor: Masae Watanabe, Iwata, Japan
[73] Assignee: Yamaha Hatsudoki Kabushiki Kaisha, Iawata-shi, Shizuoka-ken, Japan
[22] Filed: Apr. 24, 1973
[21] Appl. No.: 353,988

[30] Foreign Application Priority Data
Apr. 25, 1972 Japan.............................. 47-48926

[52] U.S. Cl. ................. 188/322; 188/282; 188/319
[51] Int. Cl. ............................................... F16f 9/19
[58] Field of Search ........... 188/282, 317, 319, 322; 137/271; 267/69 R

[56] References Cited
UNITED STATES PATENTS

| | | | |
|---|---|---|---|
| 2,087,451 | 7/1937 | Rossman et al..................... | 188/317 |
| 2,409,349 | 10/1946 | Focht................................ | 188/322 |
| 2,888,107 | 5/1959 | De Koning et al.................. | 188/319 |
| 3,180,463 | 4/1965 | Murata .............................. | 188/322 |
| 3,446,318 | 5/1969 | Duckett ............................. | 188/317 |
| 3,589,701 | 6/1971 | Gee.................................. | 267/64 R |

FOREIGN PATENTS OR APPLICATIONS

| | | | |
|---|---|---|---|
| 1,069,956 | 11/1959 | Germany ........................... | 188/322 |
| 245,951 | 3/1926 | Italy.................................. | 188/317 |
| 1,231,416 | 9/1960 | France.............................. | 188/282 |
| 1,903,821 | 9/1969 | Germany ........................... | 188/282 |
| 520,317 | 8/1954 | Italy.................................. | 188/315 |
| 493,568 | 4/1954 | Italy.................................. | 188/317 |
| 1,095,276 | 5/1955 | France.............................. | 188/319 |
| 1,296,026 | 5/1969 | Germany ........................... | 188/319 |

Primary Examiner—Trygve M. Blix
Assistant Examiner—Edward R. Kazenske
Attorney, Agent, or Firm—Thompson, Birch, Gauthier & Samuels

[57] ABSTRACT

A hydraulic shock absorber comprises a cylinder assembly whose interior is divided into first, second and third chambers by a sealing head, a reciprocating piston and a foot-valve assembly, a damping oil contained in the chambers, a by-pass formed in that portion of the cylinder assembly where the foot-valve assembly is disposed, the by-pass permitting the third chamber to communicate with the second chamber, and a jet provided at the by-pass and open into the second chamber or the third chamber, wherein the jet is detachable from the outside of the cylinder assembly without the necessity of removing the piston from the cylinder assembly.

7 Claims, 2 Drawing Figures

HYDRAULIC SHOCK ABSORBER

This invention relates to a hydraulic shock absorber, particularly to a telescopic type hydraulic shock absorber used for the rear cushion of motorcycles and automobiles wherein jets provided in a piston and a foot-valve assembly or a jet in said foot-valve assembly is detachable from the outside of a cylinder assembly without moving said piston therefrom.

A conventional telescopic type hydraulic shock absorber is provided with a piston reciprocatingly movable within a cylinder and a foot-valve assembly provided at the lower end portion of the cylinder, said piston and the foot-valve assembly each having two concentric rings of holes provided therein. The outer ring of holes is covered by a first disc valve adapted to be held down by a star-shaped disc spring and the inner ring is covered by an upwardly urged second disc valve.

When an eyed member of the shock absorber secured to the axle or wheel assembly of a motorcycle or an automobile is moved upwardly, then damping oil within a central chamber defined between the piston and the foot-valve assembly in the cylinder passes through the outer ring of holes of the piston and the inner ring of holes of the foot-valve assembly to cause the first disc valve of the piston and the second disc valve of the foot-valve assembly to be opened, thus flowing into an upper chamber and a lower chamber of the cylinder. On the other hand, when the eyed member of the shock absorber is moved downwardly, the damping oil is flowed from the upper chamber into the inner ring of holes of the piston to cause the second disc valve to be opened to permit it to be flowed into the central chamber, while the damping oil from the lower chamber is flowed into the outer ring of holes of the foot-valve assembly to cause the first disc valve to be opened to permit it to be flowed into the central chamber.

Therefore, the damping action of the shock absorber is determined by the inner diameter of the holes in the inner and outer rings of the piston as well as those of the foot-valve assembly, and a resisting force of the first and second disc valves against the flow of the damping oil. Since said holes and said disc valves have respective predetermined dimensions, where it is desired to vary the damping characteristics of the shock absorber, it is necessary that the piston and the foot-valve assembly be replaced by new ones having rings of holes whose inner diameters are suited to newly intended damping characteristics, and the first and second disc valves and their urging springs be replaced by new ones suited to the newly intended damping characteristics.

As will be evident from the above, the conventional shock absorber is required to be completely disassembled where it is desired to vary the damping characteristics. In addition, it is also necessary to replace the principal components of the shock absorber, i.e. the piston and foot-valve assembly as well as the first and second disc valves, by new corresponding ones. It is therefore disadvantageously difficult to vary the damping characteristics from the practical viewpoint.

An object of this invention is to provide a hydraulic shock absorber capable of easily adjusting and modifying its damping characteristics by optionally selecting either the size of a jet provided on a by-pass for causing the upper chamber to communicate with the central chamber, or the size of a jet mounted on a by-pass for interconnecting the central chamber with the lower chamber.

Another object of this invention is to provide a hydraulic shock absorber capable of detachably mounting a jet provided on a by-pass for the communication of the upper chamber with the central chamber and/or a jet mounted on a by-pass for interconnecting the central chamber with the lower chamber, without the necessity of removing the cylinder and the foot-valve assembly.

According to this invention there is provided a hydraulic shock absorber comprising: a cylinder assembly; a piston reciprocatingly mounted in said cylinder assembly; a sealing head fixed to one end of said cylinder assembly; a foot-valve assembly fixed in said cylinder assembly and near the other end of said assembly; a piston rod secured to said piston and passing through said sealing head; a first chamber defined by said cylinder assembly, piston and sealing head; a second chamber defined by said cylinder assemb;y, piston and foot-valve assembly; a third chamber defined by said cylinder assembly, foot-valve assembly and said other end of said cylinder assembly; damping oil contained in said first, second and third chambers; a first by-pass provided near said other end of said cylinder assembly so as to cause said second chamber to communicate with said third chamber; and a first jet detachably disposed on one end of said by-pass so as to be removable from the outside of said cylinder assembly without removing said piston from said cylinder assembly.

Furthermore, a second by-pass may be provided in the piston so as to permit the first chamber to communicate with the second chamber and a second jet may be removably mounted on that end portion of the second by-pass which is adjacent to the second chamber without the need of removing the piston from a cylinder assembly.

Figure 2:
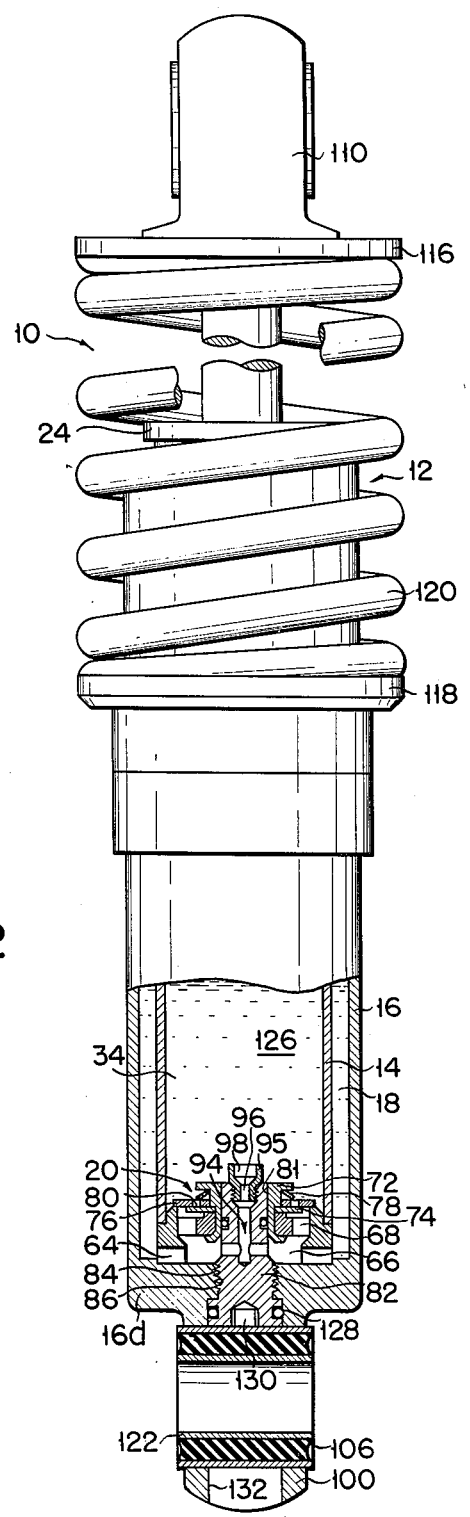

This invention will now be described by way of examples with reference to the accompanying drawings, in which:

FIG. 1 is a front view in longitudinal section showing one embodiment of a hydraulic shock absorber according to this invention; and FIG. 2 is a side view, partly in section, showing another embodiment of a hydraulic shock absorber according to this invention.

Like reference numerals are employed to designate like parts or elements throughout the specification.

Referring to FIG. 1 a hydraulic shock absorber generally designated by 10 has a cylinder assembly 12 comprising a cylinder 14 and an outer tube 16 coaxially surrounding the cylinder 14 at a spaced-apart relationship. Between the cylinder 14 and the outer tube 16 is defined a reservoir 18. At the lower portion of the cylinder assembly 12 is located a foot-valve assembly 20 whose lower portion is sandwiched between the lower end 14a of the cylinder 14 and the inner bottom surface 16a of the outer tube 16 and whose remaining portion is inserted into the cylinder 14. A sealing head 22 comprises a body 22a and a reduced portion 22b integrally formed at the lower end of the body 22a, said body and reduced portion being fitted in a liquid-tight fashion into the upper portion 16b of the outer tube 16 and the upper portion 14b of the cylinder 14, respectively.

A seal holder 24 with a seal 25 fixed therein is screwed into the upper portion 16b of the outer tube 16 in a manner to be disposed on the sealing head 22, and the seal holder 24 holds the sealing head 22, cylinder 14 and foot-valve assembly 20 in position within the outer tube 16.

A piston rod 26 slidably penetrates the sealing head 22, seal holder 24 and seal 25 in the axial direction of the cylinder 14. A liquid-tightness is attained between the piston rod 26 and the seal 25 fixed in the seal holder 24.

On a reduced portion 26a provided at the lower end of the piston rod 26 is secured, by means of a nut 30, a reciprocating piston 28 adapted to be sealingly slidable in an axial direction within the cylinder 14 and between the sealing head 22 and the foot-valve assembly 20. A first or upper chamber 32 is defined by the cylinder 14, sealing head 22 and the piston 28 and a second chamber or central chamber 34 is defined by the cylinder 14, piston 28 and foot-valve assembly 20.

In the piston 28 are provided two groups of oil passages 36, 38 for permitting the first chamber 32 to communicate with the second chamber 34, one group of the oil passages 36 converging downwardly and the other group of the oil passages 38 diverging downwardly. The shouldered portion of the piston rod 26 which is adjacent to the reduced portion 26a thereof is spaced apart from the piston 28 by a spacer 40 having a flange 40a on its upper end. A rigid valve disc 44 through which the reduced portion of the spacer 40 extends is urged downwardly, by means of an annular spring 42 disposed around the reduced portion of the spacer 40, so as to cover the upper opening of the oil passages 38. An elastic valve disc 46, through which the piston rod 26 extends, is secured, through a spacer 48, by means of the nut 30 and urged upwardly to cover the lower opening of the oil passages 36.

In the piston rod 26 is provided a by-pass 54 comprising an axial passage 50 open at its lower end and a radial passage 52 for permitting the passage 50 to communicate with the first chamber 32.

Into the lower end of the piston rod 26 is detachably screwed a jet member or orifice member 56 having a jet or orifice 58 through which the passage 50 communicates with the second chamber 34. The lower end portion of the jet member 56 is enlarged in diameter to the extent not exceeding the diameter of the reduced portion 26a of the piston rod 26 and has a square or hexagonal hole 60 open to the second chamber 34.

With the foot-valve assembly 20, the lower end of a ring-shaped valve housing 62 in inserted into a recess portion 16c provided at the inner bottom part of the outer tube 16, and an upper reduced portion 62a of the valve housing 62 is sealingly inserted into the lower end 14a of the cylinder 14. At the lower end portion of the valve housing 62, radial passages 64 are provided in a radial array to permit a third chamber or lower chamber 66 in the valve housing 62 to communicate with the reservoir 18 defined between the cylinder 14 and the outer tube 16.

Within the valve housing 62 are arranged, in a ring shape, axial oil passages 68 for permitting the third chamber 66 to communicate with the second chamber 34. A boss 62b is formed integral with the valve housing 62. Into the valve housing 62 is inserted the lower reduced cylindrical portion 72a of a sleeve 72 which comprises the lower reduced cylindrical portion 72a, an upper enlarged cylindrical portion 72b and a flange 72c formed on the top of the sleeve 72.

A ring-shaped elastic valve disc 74 through which the reduced cylindrical portion 72a of the sleeve 72 passes is fixedly disposed between the boss 62b of the valve housing 62 and the upper cylindrical portion 72b of the sleeve 72. A rigid valve disc 76 having a diameter larger than the elastic valve disc 74 surrounds the enlarged cylindrical portion 72b of the sleeve 72 and is normally urged downwardly against the top surface of the elastic valve disc 74 by an annular spring 78 located between the rigid valve disc 76 and the flange 72c of the sleeve 72. The rigid valve disc 76 is vertically movable along the upper cylindrical portion 72b of the sleeve 72. The rigid valve disc 76 is positioned above the oil passageways 68 in a manner to block them, and has communicating holes 80 arranged in a ring-like array so as to communicate with the second chamber. The communicating holes 80 are normally blocked by the elastic valve disc 74.

A columnar plug 82 is inserted into that cylindrical through hole 81 in the sleeve 82 which has an external diameter larger than that of the lower enlarged portion of the jet member 56. A male screw 84 having a diameter larger than the upper part of the plug 82 is formed on the lower part of the plug 82. The plug 82 is fixed to the outer tube 16 by screwing the male screw 84 on the lower part of the plug 82 into a screw hole 86 provided at the lower end portion 16a of the outer tube 16.

An O ring 88 for attaining a seal between the sleeve 72 and the plug 82 is provided in the outer periphery of the plug 82. In the plug 82 is formed a by-pass 94 comprising an axial passage 90 open at the upper end and radial passages 92 for permitting the passage 90 to communicate with the third chamber 66.

Into the upper end of the plug 82 is detachably screwed a jet member or orifice member 95 similar in structure to the jet member 56 mounted on the lower end of the piston rod 26.

A jet or orifice 96 of the jet member 95 permits the passage 90 to communicate with the second chamber 34, and an upwardly open square or hexagonal hole 98 is formed in the upper portion enlarged to an extent not exceeding the diameter of the plug 82.

A lower eyed member or support member 100 is formed separately from the plug 82 but integral with the outer tube 16 so as to depend from the lower end 16d of the outer tube 16. The plug 82 is secured to the lower end 16d of the outer tube 16 by screwing a male screw 84 provided on the lower end of the plug 82 into the screw hole 86. An O-ring 128 provides a seal between the lower end 16d and the plug 82. At the lower end of the plug 82 is formed a square or hexagonal hole 130.

A mounting hole 132 having a diameter not smaller than that of the plug 82 is bored diametrically through the lower eyed member 100. The mounting and detachment of the plug 82 on and from the lower end 16d are effected through the mounting hole 132. The male screw 84 of the plug 82 is screwed into, and unscrewed out of, the thread hole 86 by inserting a tool (not shown) into a square or hexagonal hole 130 provided on the lower end of the plug 82 and rotating the tool. Within an eye 104 of the eyed member 100 is inserted a rubber damper 106.

A male thread 108 is provided on the upper end of the piston rod 26 and screwed into an upper eyed member or supporting member 110 having an eye 112 into which a rubber damper 114 is inserted. A flange 116 is abutted against the lower end of the eyed member 110. Between the flange 116 and a flange 118 formed on the outer periphery of the outer tube 16, a compressive helical coil spring 120 is disposed around the outer tube 16 to cause the piston 28 to be urged upwardly through the piston rod 26 and flange 116.

The eyed members 100 and 110 are supported, through rubber dampers 106 and 114 and bearings 122 and 124, by a support member (not shown) of a wheel axle or wheel assembly of a vehicle such as a motorcycle, automobile etc. and a support member (not shown) mounted on the frame of a vehicle, respectively.

A damping oil 126 is filled in the chambers 32, 34 and 66 and half filled within the reservoir 18.

There will now be described the operation of the hydraulic shock absorber 10 according to this invention.

When an impact is applied to the wheel assembly of a vehicle provided with the shock absorber to cause the cylinder assembly 12 to be suddenly raised to permit the piston 28 to be downwardly moved relative to the cylinder assembly 12, the damping oil 126 in the second chamber 34 is compressed to cause the rigid valve disc 44 to be opened against the urging force of the annular spring 42 on the piston 28 to permit a part of the oil 126 to be flowed through oil passageways 38 into the first chamber 32, while a part of the oil 126 is flowed through jet 58 and by-pass 54 into the first chamber 32. At the same time, the compressed damping oil 126 in the second chamber 34 opens the elastic valve disc 74, and is flowed through communicating holes 80, third chamber 66 and oil passages 64 into the reservoir 18, while some is flowed through jet 96, by-pass 94, third chamber 66 and oil passages 64 into the reservoir 18. However, the elastic valve disc 46 remains closed and no flow of the oil 126 through the oil passages 36 into the first chamber 32 takes place.

Since the urging force of the annular spring 42 is very weak, the oil 126 is almost freely flowed, during the downward movement of the piston 28, from the second chamber 34 through oil passages 38 in the piston 28 into the first chamber 32, and the flow into the first chamber 32 is substantially free from any influence from the jet 58. On the other hand, the elastic valve disc 74 of the foot-valve assembly 20 has same degree of a resistance as that of the jet 96 and thus regulates a flow of the oil 126 from the second chamber 34 into the third chamber 66. Therefore, during the upward movement of the cylinder assembly 12 i.e. the downward movement of the piston 28, most damping action of the shock absorber 10 is afforded by the elastic valve disc 74 and jet 96. It follows that the change in dimension of the jet 96 allows damping characteristics involved during the downward movement of the piston 28 to be varied.

When the cylinder assembly 12 is rapidly lowered to cause the piston 28 to be moved upwardly relative to the cylinder assembly 12, the damping oil 126 within the first chamber 32 is compressed by the piston 28 to cause the elastic valve disc 46 to be opened to permit some of the oil 126 to be flowed through oil passages 36 into the second chamber 34, while some is flowed through by-pass 54 and jet 58 into the second chamber.

Since an increase in volume of the second chamber 34 due to the upward movement of the piston 28 is larger than a decrease in volume of the first chamber 32, that portion of the oil 126 corresponding to its difference is flowed from reservoir 18, partly through passages 64, third chamber 66, by-pass 94 and jet 96 into the second chamber 34, and partly through passages 64, third chamber 66, oil axial passages 68 and rigid valve disc 76 opened against the urging force of the annular spring 78, into the second chamber 34.

As the urging force of the annular spring 78 is very small, the oil 126 is almost freely flowed, during the upward movement of the piston 28, from the reservoir 18 through oil passages 68 in the foot-valve assembly 20 into the second chamber 34, and the flow into the second chamber 34 is substantially free from any influence from the jet 96. However, the elastic valve disc 46 of the piston 28 has same degree of a resistance as that of the jet 58 and regulates a flow of the oil 126 from the first chamber 32 into the second chamber 34. Therefore, during the downward movement of the cylinder assembly 12 i.e., the upward movement of the piston 28, most damping action of the shock absorber 10 is afforded by the elastic valve disc 46 and jet 58. Accordingly, a change in dimension of the jet 58 allows damping characteristics involved during the upward movement of the piston 28 to be varied.

A combination of the annular spring 42 with the rigid valve disc 44; the elastic valve disc 46; and a combination of the annular spring 78 with the valve discs 74, 76 serve as non-return valves. The valve discs 44, 46, together with the annular spring 42 constitute a piston valve 47.

As will be understood from the above, the damping action produced within the shock absorber 10 upon rapid up and down movement of the piston 28 can be adjusted by varying the diameter of the jet 58 during the upward movement of the cylinder assembly 10 and the diameter of the jet 96 during the downward movement of the cylinder assembly 10.

With the embodiment of FIG. 1 the male thread 84 is larger in external diameter than the plug 82 and, therefore, the mere withdrawal of the rubber damper 106 from the lower eyed member 100 and the unscrewing of the male screw 84 makes it possible to detach the plug 82, from the outer tube 16.

After detachment, the jet member 95 can be removed from the upper end of the plug 82, using a tool (not shown) having an engaging portion corresponding in shape to the square or hexagonal hole 98 of the jet member 95, and then replaced by a new jet member 95 having a jet 96 of different dimension.

After removing the plug 82 from the outer tube 16, the jet member 56 can be detached from the lower end of the piston rod 26 by inserting through the mounting hole 132 and through hole 81 into the square or hexagonal hole 60 of the jet member 56 a corresponding tool (not shown) and rotating the tool. The jet member 56 can be detached through the screw hole 86. The mounting of the jet members 95 and 56 into the piston cylinder assembly 12 can be easily effected in the reverse order. Where the jet member 56 is made of iron, the mounting and detachment of the jet member 56 on and from the piston rod 26 can be made without fail, if the engaging portion of the tool is magnetized. The jet member 95 can be mounted on, and removed from, the plug 82 using the same tool as mentioned above. Since the replacement of the jet members 56 and 95 can be easily made without need of whole disassembling of the shock absorber 10, a mere replacement of jet members 56 and 95 by new ones having jets 58 and 96 of a suitable dimension can optionally afford desired damping characteristics to the shock absorber 10.

With a hydraulic absorber 10 of FIG. 2, a lower eyed member 100 is formed separately from a plug 82 but integral with the outer tube 16 so as to depend from the lower end of the outer tube 16. The plug 82 is secured to the lower end 16d of the outer tube 16 by screwing male screw 84 provided on the lower end of the plug 82 into a thread hole or opening 86 formed in the lower end 16d of the outer tube 16. An O-ring 128 provides a seal between the lower end 16d and the plug 82. At the lower end of the plug 82 is formed a square or hexagonal hole 130.

A mounting hole 132 having a diameter not smaller than that of the plug 82 is bored diametrically through the lower eyed member 100. The mounting and detachment of the plug 82 on and from the lower end 16d are effected through the mounting hole 132. The male thread 84 of the plug 82 is screwed into, and unscrewed out of, the thread hole 86 by rotatably inserting a tool (not shown) into a square or hexagonal hole 130 provided on the lower end of the plug 82 and rotating the tool. The mere withdrawal of a rubber damper 106 from the lower eyed member 100 permits an easy removal and mounting of the plug from and on the lower end 16d of the outer tube 16.

In the other respects, the embodiment of FIG. 2 is substantially similar in its structure and function to that of FIG. 1. Thus, the same reference numerals are employed in FIG. 2 to denote like parts or elements and further explanation is therefore omitted.

What is claimed is:

1. A hydraulic shock absorber including:
   a cylinder assembly;
   a sealing head fixed to one end of the cylinder assembly;
   a piston reciprocatingly inserted into the cylinder assembly;
   a foot-valve assembly housed in the cylinder assembly near the other end thereof;
   a piston rod secured to the piston and passing through the sealing head;
   a first chamber defined by the cylinder assembly, piston and sealing head;
   a second chamber defined by the cylinder assembly, piston and foot-valve assembly;
   a third chamber defined by the cylinder assembly, foot-valve assembly and the other end of the cylinder assembly;
   damping oil filled in the first, second and third chambers;
   a first by-pass extending through the piston from one end of the piston rod adjacent to the second chamber to an intermediate portion of the piston rod so as to effect communication between the first and second chambers;
   a first jet detachably screwed into said one end of the piston rod so as to communicate with one end of the first by-pass adjacent to the second chamber;
   the foot-valve assembly being provided with a through hole disposed axial with the first jet and communicating at the respective ends thereof with the second and third chambers, the through hole having a larger diameter than the outer diameter of the first jet;
   the cylinder assembly being provided in the other end with an opening which has a larger diameter than the diameter of the through hole and is substantially coaxial with the first jet and through hole;
   a plug detachably inserted into the through hole in a fluid tight state;
   a second by-pass provided in the plug so as to effect communication between the second and third chambers; and
   a second jet provided in the plug so as to connect the second by-pass to the second chamber, whereby, after the plug is removed from the cylinder assembly through the opening with the second jet still mounted therein, the first jet may be drawn out of the cylinder assembly through the through hole and opening.

2. A hydraulic shock absorber according to claim 1 further comprising a support member integrally formed with the other end of the cylinder assembly so as to support the shock absorber.

3. A hydraulic shock absorber according to claim 1 further comprising a support member integrally formed with the plug and attached to the other end of the cylinder assembly so as to support the shock absorber.

4. A hydraulic shock absorber according to claim 1 wherein the plug is screwed into the other end of the cylinder assembly.

5. A hydraulic shock absorber including:
   a cylinder assembly;
   a sealing head fixed to one end of the cylinder assembly;
   a piston reciprocatingly inserted into the cylinder assembly;
   a foot-valve assembly housed in the cylinder assembly near the other end thereof;
   a piston rod secured to the piston and passing through the sealing head;
   a first chamber defined by the cylinder assembly, piston and sealing head;
   a second chamber defined by the cylinder assembly, piston and foot-valve assembly;
   a third chamber defined by the cylinder assembly, foot-valve assembly and the other end of the cylinder assembly;
   damping oil filled in the first, second and third chambers;
   a first by-pass extending through the piston from one end of the piston rod adjacent to the second chamber to an intermediate portion of the piston rod so as to effect communication between the first and second chambers;
   a first jet detachably mounted on said one end of the piston rod so as to communicate with one end of the first by-pass adjacent to the second chamber;
   the foot-valve assembly being provided with a through hole disposed axial with the first jet and communicating at the respective ends thereof with the second and third chambers, said through hole having a larger diameter than the outer diameter of the first jet;
   a second by-pass for effecting communication between the second and third chambers;
   mounting means provided in the foot-valve assembly for inserting the second by-pass in the through hole;
   the cylinder assembly being provided in the other end with an opening which has a larger diameter than the outer diameter of the first jet and the mounting means and is substantially coaxial with the first jet and through hole; and a second jet mounted in said mounting means so as to communicate with one end of the second bypass, whereby the mounting means is drawn out of the cylinder assembly together with the second jet through the opening, and thereafter the first jet is drawn out of the cylinder assembly through the through hole and opening.

6. A hydraulic shock absorber according to claim 5 wherein the first jet is detachably screwed into said one end of the piston rod.

7. A hydraulic shock absorber according to claim 6 wherein the mounting means comprises a plug detachably inserted into the opening in a fluid tight state.

* * * * *